United States Patent
Ehlebracht et al.

[11] 3,946,979
[45] Mar. 30, 1976

[54] ADJUSTABLE SUSPENSION FOR ATTACHING PIECES OF FURNITURE TO A WALL

[75] Inventors: Horst Ehlebracht; Albert Philipp, both of Herford, Germany

[73] Assignee: Firma Richard Heinze GmbH & Co. KG, Herford, Germany

[22] Filed: July 21, 1975

[21] Appl. No.: 597,741

[30] Foreign Application Priority Data
July 25, 1974 Germany............................ 2435842

[52] U.S. Cl. ................. 248/274; 248/476; 312/245
[51] Int. Cl.² A47B 67/02; A47B 43/00; A47F 5/08; A47F 3/00
[58] Field of Search.................... 248/477, 274, 476; 312/245

[56] References Cited
UNITED STATES PATENTS

| | | | |
|---|---|---|---|
| 848,624 | 4/1907 | Bell | 248/477 |
| 1,745,574 | 2/1930 | Hoegger | 312/245 UX |
| 2,830,863 | 4/1958 | Fehr | 312/245 |
| 2,903,224 | 9/1959 | Gooding | 248/274 |
| 3,791,709 | 2/1974 | Cross | 312/245 |

FOREIGN PATENTS OR APPLICATIONS
157,128 12/1956 Sweden............................ 312/245

*Primary Examiner*—J. Franklin Foss
*Attorney, Agent, or Firm*—Elliott I. Pollock

[57] ABSTRACT

An adjustable suspension for attaching a piece of furniture to a wall includes a housing having an elongated supporting arm projecting therefrom. The upper edge of the arm is provided with a rough, preferably toothed, surface which engages a protrusion within the housing having a cooperating similar surface; and the lower edge of the supporting arm is provided with a rough, preferably toothed surface which cooperates with a rotatable cam in the housing having a similar surface. By moving the arm in translation through the region between the cam and protrusion, and by rotating the cam, the free end of the arm outside of the housing may be adjusted in both height and depth relative to the housing.

15 Claims, 5 Drawing Figures

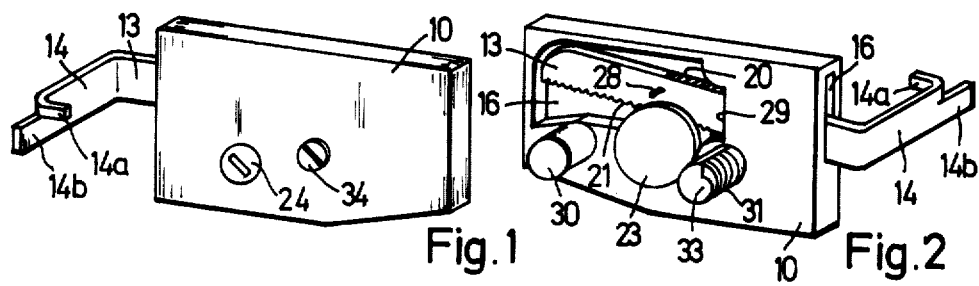
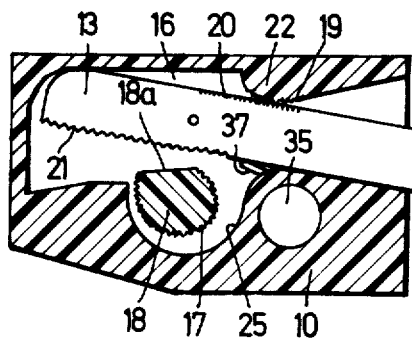
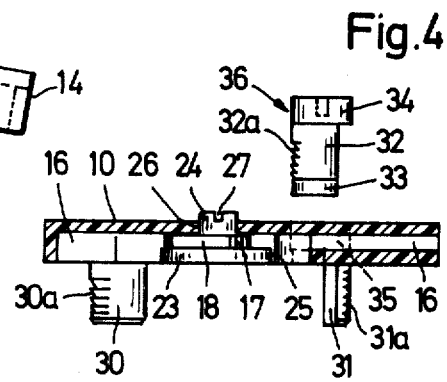
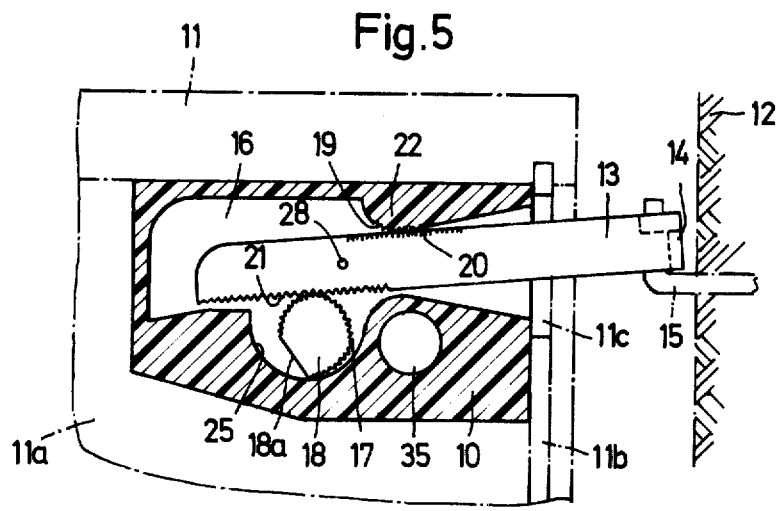

ADJUSTABLE SUSPENSION FOR ATTACHING PIECES OF FURNITURE TO A WALL

The invention concerns an adjustable suspension for attaching pieces of furniture, such as wall cupboards, to a wall, the suspension having a housing secured to the inside of the furniture side-wall, and a supporting arm adjustable within the housing for height and depth.

Various embodiments of this type of adjustable suspension are known. Disadvantages of the known suspensions involve their large volume and their unfavourable adjustment.

More particularly, in order to adjust the height and distance to the wall of the piece of furniture, two adjusting means, such as screws, have to be actuated in prior art suspensions, which, on the one hand, complicates manipulation and on the other hand, because of the necessary bearings for the adjusting means, leads to large devices.

Because the adjusting means are largely made with screws, an undesirable change of position of the suspended piece of furniture, for example through vibrations, cannot be excluded so that the efficiency of these suspensions is insufficient.

The purpose of the present invention is to provide an adjustable suspension for pieces of furniture, of the type first mentioned above, which is improved and of less volume, especially flat, having a simple means of adjustment, and in which the adjusted position is automatically secured.

Furthermore, the suspension is cheap and easy to manufacture, comprises few parts, and has a long lasting construction.

Only a single adjusting means for adjusting the suspension is needed, which is simultaneously a part of the securing means for the adjusted supporting arm.

A further object of the invention resides in the provision of a simple and secure method of affixing the suspension to the piece of furniture.

According to the invention, an adjustable suspension for pieces of furniture, of the type first mentioned above, is characterized in that a rotatable cam with a rough, preferably toothed surface, is borne in the housing below the supporting arm, and an opposing area with a rough, preferably toothed surface, is provided in the housing above the supporting arm, and the length of arm within the housing is provided with a rough, preferably toothed upper and lower securing area along its edges, of which the lower securing area co-acts with the cam for adjustment of height and depth, and the upper securing area serves to arrest the the supporting arm in the adjusted position.

The housing is flat, of equal, rectangular or trapezoidal cross-section throughout, and has a slot-like recess open at one end edge of the housing, in which the supporting arm is adjustably located, and into which the cam surface and the opposing surface project.

The cam can be arranged off-center in the housing, and the opposing area is located at a distance above the cam and toward the open end of the housing; the cam has in extension of its axis, a bearing disc, rotatably borne in a bearing recess in the housing, and at the other end, a head with means, such as a screw-slot, for receiving a tool, borne in the housing and accessible from the outside.

A spring element can be provided in the housing, which operates against the underside of the supporting arm for bringing or holding the arm out of contact with the cam, the spring being preferably secured during manufacture.

An externally toothed dowel is provided on the side of the housing opposite to the head of the cam, and at distance from the dowel, a tensioning peg is provided which, by means of a tensioning cylinder and cam, rotatably located in the housing, can be moved away from the dowel becoming clamped against the side of a bore in the furniture in which it is situated.

Advantageously, the adjustable suspension according to the innovation, has very little volume and, being flat, takes up little space inside the furniture.

A further advantage of the invention is the simple and automatic securing of the supporting arm adjustment; the supporting arm being adjusted for height by a single adjusting means (cam), and for depth can be slid by hand, whereby an improved and more sensitive adjustment is achieved.

Simultaneously, because of the toothed cam and the toothed areas on the supporting arm and the housing, after height and depth adjustment the position is automatically secured by the weight of the furniture on the supporting arm which can no longer accidentally alter its position, for example through vibrations, thus providing an extremely stable positioning of the furniture.

The device is simply and cheaply manufactured of few parts, and of long lasting construction, since only a relatively small cam is necessary for the adjustment of the supporting arm, and furthermore having a favourable arrangement, obviates the complicated and space-taking bearings and adjusting means, permitting the flat and compact construction of the present device.

A further advantage of the invention is seen in the simple and secure method of affixing the device to the furniture by means of the dowel tensioning.

In the drawing, an embodiment according to the invention is depicted, wherein:

FIG. 1 is a perspective, front view of an adjustable suspension,

FIG. 2 is a perspective, rear view of the suspension,

FIG. 3 is a vertical section through the suspension and depicts the supporting arm arranged in a housing for adjustment of height and depth, FIG. 4 is a horizontal section through the suspension and depicts the securing pin and tensioning cam, and FIG. 5 is a vertical section through the suspension with the supporting arm locked, taking the load of a piece of furniture Numeral 10 indicates a housing of an adjustable suspension with which pieces of furniture 11, like wall cupboards, can be adjusted for height and depth, and thus be accurately positioned on a wall 12.

For hanging a wall cupboard 11, at least two suspensions are required which are secured with their housings each to the inside of a cupboard side-wall.

In the housing 10 of each suspension a supporting arm 13 is arranged, adjustable for height and depth, and with a securing part 14 protruding out of the housing 10 for releasable connection with a fixture 15, such as a hook, a ring, a rail or the like, affixed in or on the wall 12.

The housing 10 is formed from a flat body with a rectangular or trapezoidal basic shape, which has a rectangular cross-section with its greatest extension running vertically.

The housing 10 has a pocket-like recess 16 in which the supporting arm 13 is situated, protruding out of an opening at one end.

The cross-sectional dimensions throughout the entire base form of the housing 10 are equal, thus giving the housing 10 its flat construction.

A rotatable cam 18 with a rough, preferably toothed surface 17, is borne in the housing 10 below the supporting arm 13, and a rough, preferably toothed opposing surface 19 is provided in the housing 10 above the supporting arm 13. The supporting arm 13, which is in cross-section a vertically extended rectangle, and thus parallel the housing, is provided on the upper and lower sides with a rough, preferably toothed locating surface 20, 21 at zones within the housing, of which the lower locating surface 21 co-acts with the cam 18 for the adjustment of height and depth, and the upper locating surface 20 serves for holding the position of the supporting arm 13.

The supporting arm 13 is formed from a flat strip and is arranged with its longest zone within the housing 10.

The cam 18 is located outside of the central zone of the housing 10, and the opposing surface 19 extends at a distance above the cam 18 and toward the opening of the recess in the housing 10. The cam 18 and the opposing surface 19 are thus diagonally positioned and the vertical distance between the two retaining zones 17, 19 is greater than the vertical extent of the supporting arm 13.

The toothed opposing surface 19 is formed on a bow-shaped projection 22 in the area of the recess 16, which reduces the width (height) of the recess 16 extending through the length of the housing and widening vertically at the open end, for a part of its length at a distance from the open end.

The toothed surface 21 on the supporting arm 13, which co-acts with the cam 18, extends along the lower edge of the supporting arm for part of the portion of the end within the housing 10, and the toothed surface 20, which co-acts with the opposing surface 19, extends along the upper edge of the arm for a part of the middle portion of the supporting arm 13. Preferably, both zones are provided with teeth of equal size 20, 21.

The cam 18 with its toothed surface 17 is formed in one with a bearing disc 23 and a head 24. On one side of the cam, in the direction of the cam axis, the bearing disc 23 is located in a circular bearing bore 25 in the housing 10, and on the other side, formed from an extension, a cylindrical and circular head 24 is provided which is located in a bearing bore 26 in the housing 10 opposite the bearing 25, and the end surface of which can be provided with an operating means 27 such as a screw-slot, an hexagonal recess or the like.

The cam 18 has a flat 18a on its circumference so that only part of the circumference of the cam 18 is provided with a toothed surface 17, and by means of which the greatest possible distance between the cam 18 and the opposing surface for free and unhindered sliding of the supporting arm can be achieved. This flat 18a, when turned toward the supporting arm 13, provides a zero position for the cam 18, in which it has no effect and allows free sliding of the supporting arm.

The securing part 14 is formed by an angle, preferably a right-angle in the supporting arm 13, from which a lug 14a is bent at an angle, preferably a right-angle, back towards the housing 10 making a U-shaped bracket for hanging on the hook 15.

The straight lug 14b, running in continuation of the securing part 14, serves for securing the supporting arm 13 behind a recessed rail for fixture 15, whereby the lug 14b locates securely in the recess of the rail on the wall 12, and the angled lug 14a is supported on top of the rail. The sliding movement of the supporting arm 13 is limited in the outward direction by means of a protrusion 28, or pin which co-acts with an abutment surface 29 of the housing 10. The inward movement of the supporting arm 13 is limited by the free end of the arm 13 abutting the interior wall of the recess 16 opposite to the open end of said recess.

The supporting arm 13 passes through a hole 11c in the back 11b of the piece of furniture.

For joining the housing 10 to the side wall 11a of the piece of furniture, a dowel 30 is provided on the side of the housing opposite to the head 24 of the cam 18, and, spaced apart therefrom, a tensioning peg 31 is also provided which, by means of a bolt 36 extending through the housing 10 can be clamped against the wall of a receiving bore in the side-wall 11a of the furniture, increasing the distance from the dowel 30 for securely fixing the housing.

The tensioning peg 31 is arc-shaped and is arranged with the bow away from the dowel 30, having teeth on its outer side 31a. The dowel 30 also has teeth 30a on the side away from the tensioning peg 31, so that two sets of teeth working in opposite directions prevent withdrawal of the housing. The tensioning bolt 36 has a cylindrical, toothed part 32a, and at one end is provided with a cam 33 which works in conjunction with the tensioning peg 31, while at the other end a tool-receiving head 34 is provided. The head 34 and the cylindrical part 32 are carried in a stepped bore 35 in the housing 10.

The side-wall 11a of the piece of furniture is provided with two bores, spaced apart, one of which receives the toothed dowel 30, and into the other of which the tensioning peg 31 fastens for securing the housing 10 to the wall. After the housing 10 is fitted, the tensioning bolt 36 with the securing means 30, 31 inserted, is rotated so that the cam 33 co-acts with the tensioning peg 31, pushing it away from the cylinder part of dowel 30 and thereby clamping elements 30, 31 in the bores of the piece of furniture.

In addition to fixing the housing 10 to the furniture by clamping, the teeth 30a, 31a and 32a provide further security, preventing withdrawal of the housing from the bores in the furniture wall.

After the housing 10 has been affixed to the side-wall 11a, the positioning of the wall cupboard is carried out. For adjusting the height depth of the wall cupboard 11, it must be manually lifted so that the supporting arm 13 is free and without load, and can be slid between its locating surfaces 17, 19. The cam 18 is rotated for adjusting the height, and the supporting arm 13 is pushed into and out of the housing 10 for the depth position. When the wall cupboard is released it settles until the toothed surface 21 of the supporting arm 13 contacts the cam 18 and the teeth 20 locate under the teeth 19, and then takes the weight of the cupboard 11 via the housing 10.

By more or less rotation of the cam 18, the supporting arm 13 is turned more or less in a vertical direction about the opposing surface 19 which acts as a pivot, thereby positioning the height, and by sliding the supporting arm more or less in a horizontal direction the adjustment for depth is achieved. Rotation of the cam 18 and re-positioning of the supporting arm 13 always takes place when the load has been removed from the supporting arm 13, i.e. when the wall furniture 11 has been lifted and the supporting arm 13 is free.

The two opposing sets of teeth 17, 19 locate in the teeth 21, 20 of the supporting arm 13 and prevent both sliding movement of the supporting arm 13 and rotary movement of the cam 18 when under load, i.e. when the weight of the cupboard is taken by the supporting arm 13. Because of the locking effect of toothed zones 17, 19, 20, 21 unwanted slipping of the supporting arm 13 or rotation of the cam cannot occur, and the supporting arm 13 is securely located.

In order that the supporting arm 13 is always moved out of the teeth 17 of the cam 18 during adjustment of the cupboard 11, a spring element 37, preferably a flat spring, is provided which acts at one end upon the housing 10 and at the other end upon the supporting arm 13 and swings it upwards in the condition of no-load. The spring element 37 acts on the lower edge of the supporting arm 13.

It is preferred to form the housing 10 from a single piece of plastic material, and during manufacture to provide the spring element 37 in the recess 16 of the housing 10 as an integrally moulded resilient tongue.

It is furthermore preferred to form the cam 18 with the bearing disc 23 and the head 24 from plastic material in one piece. The supporting arm 13 is preferably made of metal.

The housing 10 is partially open on the side adjacent to the furniture wall 11a so that the recess 16 is accessible, but it can also be closed on this side.

Instead of the toothed surfaces 17, 19, 20, 21, other rough surfaces can be provided such as cross-cut, ribbed, corded, or the like.

We claim:

1. Adjustable suspension for attaching pieces of furniture, such as wall cupboards, to a wall, said suspension having a housing adapted to be secured to the inside of the furniture side-wall, a supporting arm adjustable within the housing for height and depth, a rotatable cam, having a rough surface, located in the housing below the supporting arm, and an opposing area, having a rough surface, provided in the housing above the supporting arm, the length of the supporting arm within the housing being provided with rough upper and lower securing areas along its edges, the lower securing area coacting with the cam for adjustment of height and depth, and the upper securing area coacting with said opposing area to arrest the supporting arm in the adjusted position.

2. Suspension according to claim 1, wherein the housing is flat and of equal cross-section throughout.

3. Suspension according to claim 1 wherein the housing has a slot-like recess opening into one end edge of the housing, the supporting arm being adjustably located in said recess, the cam surface and the opposing area each projecting into said recess.

4. Suspension according to claim 2 wherein the supporting arm is formed from an elongated flat strip, of rectangular cross-section, having its longest sides running parallel to the housing, one end of said strip having an angled securing part protruding from the housing.

5. Suspension according to claim 1 wherein the lower edge of the supporting arm is provided with a toothed securing area extending from the free end of the arm within the housing for part of the length of said arm, and the upper edge of said arm is provided with a toothed securing area for part of the length of said arm adjacent its middle.

6. Suspension according to claim 3 wherein the cam is arranged off-center in the housing, and the opposing area is located at a distance above the cam and toward the open end of the recess at the edge of the housing.

7. Suspension according to claim 1 wherein one end of the axis of the cam is provided with a bearing disc which is rotatably supported in a bearing recess in the housing, and the other end of the axis of the cam is provided with a head having means for receiving a tool to rotate said cam, said head being supported in the housing with said means being accessible from the outside of the housing.

8. Suspension according to claim 3 wherein said opposing area is formed as a protuberance in the housing located at a distance from the open edge of the housing.

9. Suspension according to claim 1 wherein a portion of the outer surface of the cam is provided with a flat region.

10. Suspension according to claim 1 wherein movement of the supporting arm is limited in an outward direction by means of a projection coacting with a surface of the housing.

11. Suspension according to claim 1 wherein the supporting arm is provided with an angled securing part having a lug angled back towards the housing and a further lug extending as a continuation of the securing part.

12. Suspension according to claim 7 wherein an externally toothed dowel is provided on the side of the housing opposite to the head of the cam, a tensioning peg extending from said housing at a distance from the dowel, and a tensioning bolt rotatably located in the housing for moving said peg away from the dowel to clamp said peg against the side of a bore in the furniture in which it is situated.

13. Suspension according to claim 12, wherein the tensioning peg is arc-shaped, the tensioning bolt being provided with a cylindrical part having a head part at one end thereof, said bolt also being provided with a cam which coacts with the tensioning peg, the cylindrical part and the head part of said bolt being rotatably supported in a stepped bearing hole in the housing.

14. Suspension according to claim 12 wherein the housing, the dowel and the tensioning peg are formed as a single plastic part, the cam and its bearing disc and head also being formed as a single plastic part, and the supporting arm is made of metal.

15. Suspension according to claim 1 wherein the housing is provided with a spring element which operates against the underside of the supporting arm to urge said arm out of contact with the cam, the spring comprising a resilient tongue secured in the housing.

* * * * *